US010282622B2

(12) United States Patent
Togashi et al.

(10) Patent No.: US 10,282,622 B2
(45) Date of Patent: May 7, 2019

(54) MARINE INTRUSION DETECTION SYSTEM AND METHOD

(71) Applicant: HITACHI KOKUSAI ELECTRIC INC., Tokyo (JP)

(72) Inventors: Junichi Togashi, Kodaira (JP); Wataru Ito, Kodaira (JP); Masaya Okada, Kodaira (JP); Kazunari Iwanaga, Kodaira (JP); Miyuki Fujii, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 15/761,748

(22) PCT Filed: Dec. 9, 2016

(86) PCT No.: PCT/JP2016/086774
§ 371 (c)(1),
(2) Date: Mar. 20, 2018

(87) PCT Pub. No.: WO2018/105112
PCT Pub. Date: Jun. 14, 2018

(65) Prior Publication Data
US 2019/0065859 A1  Feb. 28, 2019

(51) Int. Cl.
*G06K 9/00* (2006.01)
*G06K 9/32* (2006.01)
(Continued)

(52) U.S. Cl.
CPC ........... *G06K 9/00771* (2013.01); *G01V 8/10* (2013.01); *G06K 9/0063* (2013.01);
(Continued)

(58) Field of Classification Search
CPC ....... G01S 13/95; Y02E 10/38; G08B 13/196; G01V 8/10; G06T 7/248; G06T 7/277;
(Continued)

(56) References Cited

U.S. PATENT DOCUMENTS

| 2007/0073518 A1* | 3/2007 | Harrison | ............... G05B 23/024 |
| | | | 702/183 |
| 2016/0157073 A1* | 6/2016 | Ishikawa | ................. H04W 4/90 |
| | | | 455/404.1 |
| 2016/0203696 A1* | 7/2016 | Suzuki | ................. G01C 13/002 |
| | | | 702/2 |

FOREIGN PATENT DOCUMENTS

| JP | 2002-208073 A | 7/2002 |
| JP | 2002-279429 A | 9/2002 |

(Continued)

OTHER PUBLICATIONS

Gunnar Farnebäck, "Two-Frame Motion Estimation Based on Polynomial Expansion", Scandinavian Conference on Image Analysis, 2003.

(Continued)

*Primary Examiner* — Kenny A Cese
(74) *Attorney, Agent, or Firm* — McDermott Will & Emery LLP

(57) ABSTRACT

A system detects a candidate for an object which intrudes based on images of a visible light camera and a far-infrared camera that monitor the sea, further derives a size, a velocity, an intrusion direction, and linearity, and identifies the object to some extent. Also, the system distinguishes between a boat, a human, and a floating matter based on the luminances or the like in a far-infrared image. In addition, the system observes the periodicity of normal waves on the sea surface at a location without any object by performing the Fourier transform on the image. The accuracy of identification of an object is improved based on the correlation between the (Continued)

motion of waves in a normal state and the motion of the object.

14 Claims, 7 Drawing Sheets

(51) Int. Cl.
| | |
|---|---|
| *G06N 3/02* | (2006.01) |
| *G06T 7/246* | (2017.01) |
| *G06T 7/277* | (2017.01) |
| *G08B 13/196* | (2006.01) |
| *G01V 8/10* | (2006.01) |
| *G06K 9/42* | (2006.01) |
| *G06K 9/62* | (2006.01) |
| *G06K 9/46* | (2006.01) |

(52) U.S. Cl.
CPC ............ *G06K 9/3241* (2013.01); *G06T 7/248* (2017.01); *G06T 7/277* (2017.01); *G08B 13/196* (2013.01); *G06K 9/42* (2013.01); *G06K 9/4604* (2013.01); *G06K 9/4661* (2013.01); *G06K 9/6262* (2013.01); *G06K 9/6282* (2013.01); *G06N 3/02* (2013.01); *G06T 2207/20224* (2013.01); *G06T 2207/30168* (2013.01); *G06T 2207/30232* (2013.01)

(58) Field of Classification Search
CPC . G06T 2207/20224; G06T 2207/30232; G06T 2207/30168; G06K 9/00771; G06K 9/0063; G06K 9/42; G06K 9/3241; G06K 9/4661; G06K 9/4604; G06K 9/6282; G06K 9/6262
See application file for complete search history.

(56) References Cited

FOREIGN PATENT DOCUMENTS

| | | | |
|---|---|---|---|
| JP | 2002-352340 | A | 12/2002 |
| JP | 3997062 | B2 | 10/2007 |
| JP | 2008-078926 | A | 4/2008 |
| JP | 4117073 | B2 | 7/2008 |
| JP | 4302801 | B2 | 7/2009 |
| JP | 4476517 | B2 | 6/2010 |
| JP | 4921857 | B2 | 4/2012 |
| JP | 5021913 | B2 | 9/2012 |
| JP | 2013-181795 | A | 9/2013 |
| JP | 2013-201714 | A | 10/2013 |
| JP | 5709255 | B2 | 4/2015 |
| WO | 2010/084902 | A1 | 7/2010 |

OTHER PUBLICATIONS

Alvise Benetazzo, et al., "Observation of Extreme Sea Waves in a Space-Time Ensemble", Journal of Physical Oceanography, vol. 45, No. 9, Sep. 11, 2015.

Ichiro Fujita and Hiroki Hara, "Application of Two Dimensional Fast Fourie Transform to River Surface Flow Measurement with Space Time Image", Annual Journal of Hydraulic Engineering, JSCE, vol. 54, pp. 1105-1110, Feb. 2010.

Toru Inaba et al., "Water Depths Estimation Through Analyses of Plan Wave Pictures", 55th Annual Meeting of the Japan Society of Civil Engineers, 2-5, (Sep. 2000).

Search Report issued in corresponding International Patent Application No. PCT/JP2016/086774, dated Feb. 14, 2017.

Decision to Grant issued in corresponding Japanese Patent Application No. 2018-513902, dated Apr. 6, 2018.

* cited by examiner

MARINE INTRUSION DETECTION SYSTEM AND METHOD

CROSS REFERENCE

This application is the U.S. National Phase under 35 U.S.C. § 371 of International Application No. PCT/JP2016/086774, filed on Dec. 9, 2016, the entire contents of which are hereby incorporated by reference.

TECHNICAL FIELD

The present invention relates to a surveillance system that detects a ship, a swimmer, a drifting object and the like on water based on images from a surveillance camera installed on the coast.

BACKGROUND ART

In recent years, less expensive video cameras with high sensitivity and resolution are available, and a region in a wide range such as sea can be imaged by a practical number of cameras, and the image of an object can be captured.

A technique is known, which detects a boat which has intruded into a surveillance area at sea, without being affected by waves (see, for example, Patent Literatures 1 to 6).

It is to be noted that a known technique related to the present invention estimates a phase velocity, a period, and a wave height of waves on the sea surface from camera images (see, for example, Non Patent Literatures 2 and 3).

CITATION LIST

Patent Literature

Patent Literature 1: JP 2013-181795A
Patent Literature 2: JP 4117073B
Patent Literature 3: JP 3997062B
Patent Literature 4: WO 10/084902
Patent Literature 5: JP 2002-279429A
Patent Literature 6: JP 4302801B
Patent Literature 7: JP 5709255B
Patent Literature 8: JP 4476517B
Patent Literature 9: JP 4921857B
Patent Literature 10: JP 5021913B

Non Patent Literature

Non Patent Literature 1: Gunnar Farneback, "Two-frame motion estimation based on polynomial expansion", Scandinavian Conference on Image Analysis, 2003, Internet <URL:http://www.diva-portal.org/smash/get/diva2:273847/FULLTEXT01.pdf>.
Non Patent Literature 2: Benetazzo, Alvise, et al, "Observation of extreme sea waves in a space-time ensemble", Journal of Physical Oceanography Vol. 45, No. 9, 11 Sep. 2015, Internet <http://journals.ametsoc.org/doi/pdf/10.1175/JPO-D-15-0017.1>.
Non Patent Literature 3: Hiroki Hara, and Ichiro Fujita, "Application of two dimensional Fast Fourier transform to river surface flow measurement with space time image", Annual journal of hydraulic engineering, JSCE, Vol. 54, February, 2010, Internet <URL:http://library.jsce.or.jp/jsce/open/00028/2010/54-0185.pdf>.
Non Patent Literature 4: Toru Inaba and three others, "Water depths estimation through analyses of plan wave pictures", 55th annual meeting of the Japan Society of Civil Engineers, 2-5, (September, 2000), Internet <http://library.jsce.or.jp/jsce/open/00035/2000/55-2/55-2-0005.pdf>.

SUMMARY OF INVENTION

Technical Problem

However, with the above-mentioned conventional techniques, for instance, when a boat, a swimmer (human), and a floating matter (object) intrude, the capability of identifying which one is a boat, a swimmer, or a floating matter is limited. For instance, a method of estimating the type of an object from the size, an approximate shape, and a speed of the object is insufficient in accuracy. For this reason, simultaneous detection of a boat, a human, and an object has been considered to be difficult.

Also, how far an intruded object is from land, in other words, a level of intrusion to the land cannot be estimated only from an image. When accurate installation position and image-capture angle view of a camera are available, calculation has to be performed with reference to those values.

In view of the above-mentioned problem, it is an object of the present invention to provide a surveillance system that comprehensively detects various objects which may intrude from the sea and gives a warning.

Solution to Problem

A marine intrusion detection system according to an embodiment detects a candidate for an object which intrudes from images of a visible light camera that monitors the sea, further drives a size, a velocity, an intrusion direction, and linearity, and identifies the object to some extent. At the same time, the marine intrusion detection system detects an intruding object from images of a far-infrared camera, and distinguishes between a boat (high luminance), a human (medium luminance), and a floating matter (the same luminance as the luminance of the sea) based on the difference between the luminances. In addition, at the same time, the marine intrusion detection system analyzes the motion of waves in a normal state without any object. In order to analyze the motion of waves, a periodicity of temporal variation in the luminance is observed using the Fourier transform. In comparison with the motion of waves in a normal state, for instance, for a boat, correlation with the motion of waves is substantially not observed, for a human, the motion is different from the motion of waves and so correlation with the motion of waves is relatively low, and for an object such as a drum, the object substantially floats over the waves and so correlation with the motion of waves is relatively high. Using these, the accuracy of identification of an object is improved. A marine intrusion detection system according to another embodiment automatically tracks an object using a slewing camera. However, the angle of view constantly changes when an object is tracked, and thus the position of a detected object cannot be calculated. It is not necessary to set where the land is in advance, and an approximate position of the object is derived using the periodicity of waves in order to measure the distance to the land. In contrast to the offing, at a place near the land, the depth of water decreases, and thus the periodicity of waves is disturbed and a change such as weakened periodicity is observed. With this change, the distance to the land is roughly estimated, and a level of intrusion is automatically derived.

Advantageous Effects of Invention

According to the present invention, a boat, a human, and a floating matter can be detected with high reliability.

DESCRIPTION OF EMBODIMENTS

A surveillance system in an embodiment of the present invention detects a candidate for an object which intrudes from images of a visible light camera that monitors the sea, further derives a size, a velocity, an intrusion direction, and a linearity, and identifies the object to some extent. At the same time, the marine intrusion detection system detects an intruding object from images of a far-infrared camera, and distinguishes between a boat (high luminance), a human (medium luminance), and a floating matter (the same luminance as the luminance of the sea) based on the difference between the luminances. In addition, at the same time, the marine intrusion detection system analyzes the motion of waves in a normal state without any object. In order to analyze the motion of waves, a periodicity of temporal variation in the luminance is observed using the Fourier transform. In comparison with the motion of waves in a normal state, for instance, for a boat, correlation with the motion of waves is substantially not observed, for a human, the motion is different from the motion of waves and so correlation with the motion of waves is relatively low, and for an object such as a drum, the object substantially floats over the waves and so correlation with the motion of waves is relatively high. Using these, the accuracy of identification of an object is improved.

A marine intrusion detection system according to another embodiment automatically tracks an object using a slewing camera.

However, the angle of view constantly changes when an object is tracked, and thus the position of a detected object cannot be calculated. It is not necessary to set where the land is in advance, and an approximate position of the object is derived using the periodicity of waves in order to measure the distance to the land. In contrast to the offing, at a place near the land, the depth of water decreases, and thus the periodicity of waves is disturbed and a change such as reduced periodicity is observed. With this change, the distance to the land is roughly estimated, and a level of intrusion is automatically derived.

Embodiment 1

Figure 1:
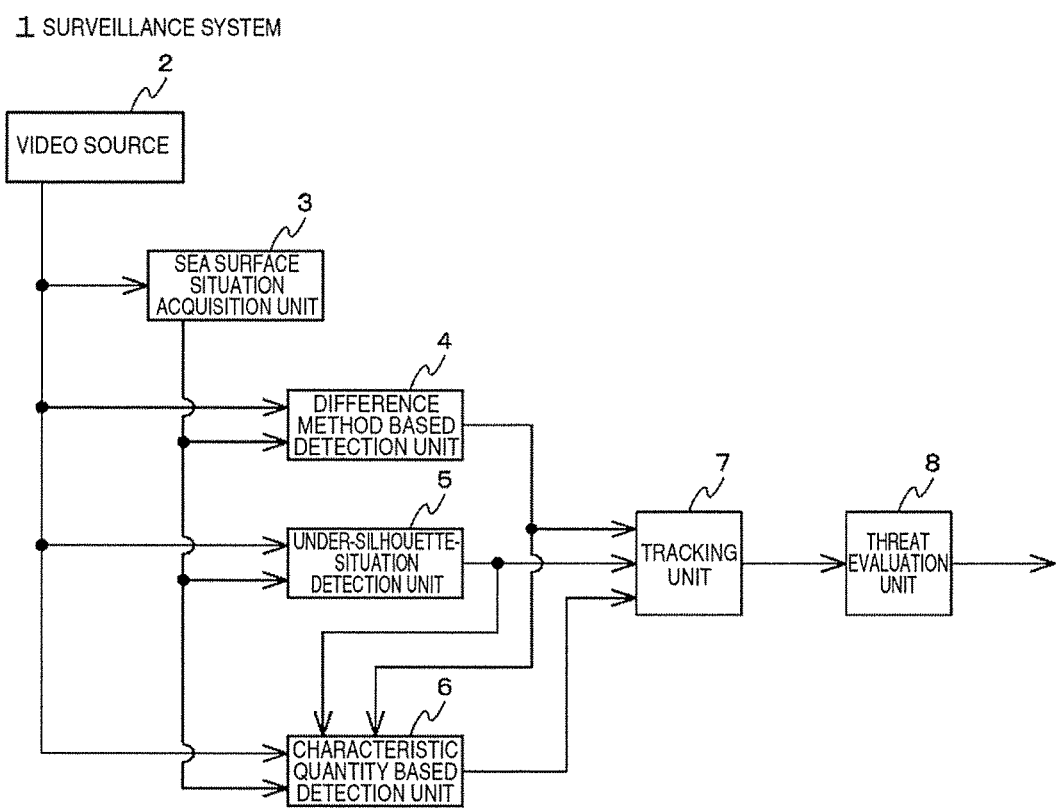
FIG. 1 is a block diagram illustrating an example of logical configuration of a surveillance system 1 of Embodiment 1.

FIG. 1 is a block diagram illustrating an example of logical configuration of a surveillance system 1 of Embodiment 1 of the present invention. The surveillance system 1 of the present example includes a video source 2, the sea surface situation acquisition unit 3, the difference method based detection unit 4, the under-silhouette-situation detection unit 5, the characteristic quantity based detection unit 6, the tracking unit 7 that tracks by integrating those results, and the threat evaluation unit 8.

The video source 2 is a surveillance camera that is installed on the shore and captures an image of the sea surface, or a device that reproduces a recorded video. The surveillance camera may be equipped with an electric camera platform and/or a power zoom lens. Also, the video may be obtained from any one of a visible light range, near-infrared range, and a far-infrared range, and may be any one of one channel (gray scale) and a multi-channel (color). In addition, shake correction, heat haze correction, automatic white balance, gray level correction, and high dynamic range (HDR) composition may be made. Also, the video source 2 may output an image in a plurality of versions, to which spatial domain or time domain filter is applied, for subsequent 3 detection units. Also, in case of a situation where an input image is required again in a subsequent stage of processing, past input images in a plurality of frames may be held to allow free reading.

As an example, a sea surface situation acquisition unit 3 automatically estimates a temporal period, a spatial period, an amplitude (vertical motion) of the waves on the sea surface on the background based on the input image. For estimation of these, various techniques can be utilized, such as a classical method like Particle Image Velocimetry (PIV), the stereo image method in Patent Literature 2, and the space-time image method in Patent Literature 3. It is not necessary to perform the processing constantly, and part or all of the processing may be intervened by a human operation. Also, the processing is not required to be performed on the entire image frame, and may be performed only at several representative places of the region of the sea surface. Conversely, the region on the sea surface in the frame can also be estimated through the trial of acquisition by the sea surface situation acquisition unit 3.

Although it is possible to verify that the temporal period, the amplitude, the wave number are properly obtained, and to complement the values each other by utilizing laws that hold therebetween, Patent Literature 2 suggests that when a plurality of waves overlap, the waves do not necessarily follow the law. Observation of actual waves near a seashore shows that a waveform gradient (significant wave height/wavelength of significant wave) is 0.05 or less, and it is known that in many cases, a distribution has a peak near 0.01 except for rare high waves. In this example, the accuracy is improved by using an amplitude which is directly determined from a low depression angle image. That is, an image of waves is classified into bright portions and dark portions, and one of apparent heights (the number of vertical direction pixels in the image) in the parts, for instance the one with a smaller average value or a smaller dispersion value is adopted. The amplitude obtained by this method is an apparent amplitude in the image. No effect is caused on error due to coordinate conversion between the camera image and the real world.

A difference method based detection unit 4 detects a pixel for which a value changes at a higher speed than in the reference image (background), and is similar to what is described in Patent Literatures 2 to 6. It is assumed that the waves observed on the sea surface image-captured in a visible range of several 10 meters to several kilometers have a period of about several seconds. In the above-mentioned literatures, a background image is generated by moving-averaging an input image in a manner in which periodic variation of waves is followed, and for each pixel, threshold processing is performed on the absolute value of the difference between the latest input image and the background image, thereby detecting a high-speed moving object. In this example, a short-time background image which is specialized in suppressing only variation in the pixel value with a period of several Hz due to waves, and a long-time background image, in which all moving objects other than the background constructions are removed as much as possible by average over several minutes to several hours, are created, and a candidate region (region of interest) such as a boat is extracted based on the difference between the short-time background image and the long-time background image. A region of interest can be represented by a bit map itself consisting of the above-mentioned logical values or the attributes of the region of interest. In relation to a circumscribed rectangle of a block of pixels having a value of 1 in a bit map, various attributes of a region of interest are defined, for instance, in the block, the coordinates of a centroid, the coordinates of the lowest point, the lengthwise size of the circumscribed rectangle, the crosswise size, an aspect ratio, an average luminance, an edge amount, the number of pixels (area), a level of filling, a circumferential length, a circular level, and a complexity level. Here, the sides of the circumscribed rectangle are set to be horizontal or vertical to the image frame all the time. The average luminance and the edge amount are calculated from the pixels corresponding to a block of attention in the short-time background image or the input image. Also, the level of filling is a ratio of the number of pixels having a value of 1 in the circumscribed rectangle. Also, as one of the attributes of a region of interest, an apparent distance between the lowest end of the region and the horizon may be added.

In the difference method, an update velocity and a threshold of the background are important controllable parameters. The update velocity can be automatically adjusted according to the temporal period obtained by the sea surface situation acquisition unit 3, and the number of detected regions of interest. In particular, it is desirable that the update velocity (characteristics of a generation filter) of a short-time background image be carefully adjusted so that a swimmer and a floating matter remain in the short-time background image and are detected.

In the threshold processing, for each pixel in a short-time background image, the difference from the pixel value of a corresponding pixel (block) in a long-time background image in a distribution model to which the pixel probably belongs is calculated. The threshold processing is achieved by comparing the absolute value of the difference with a threshold based on the variance of the corresponding pixel, and a logical value of 0 or 1 is outputted. When the pixels in an input image are modeled, in a short-time background image, pixels belonging to different distribution models overlap temporally. Therefore, the threshold is adjusted with respect to a reference which is the value obtained by adding ½ of the difference between respective averages of the model and an adjacent model to the variance of the distribution model. When the input image is a color image, a threshold present for each color is used, and when a threshold is exceeded even for one color, 1 is set (in other words, logical sum), or the threshold processing may be further performed on the sum of exceeded amounts from the threshold. Alternatively, two types of thresholds may be prepared: in the one, detection failure is few, whereas erroneous detection is often, and in the other, erroneous detection is often, whereas detection failure is often, and results of respective processing may be outputted.

It is to be noted that in both background images for short-time and long-time may be generated by time domain processing after a spatial low-pass filter or down sample processing having the characteristics corresponding to a spatial period of waves is applied to an input image.

The under-silhouette-situation detection unit 5 detects a dark region as a region of interest from an image which shows an object having a substantially dark luminance on the background having a substantially saturated luminance. It is similar to the device described in Patent Literature 3. Such an image is captured in a situation in which the sunlight is directly incident or is reflected on the sea surface and incident to a camera particularly at a time when the position of the sun is low. Similarly to the difference method based detection unit 4, a result of the detection is outputted as the attribute of bit map or region of interest.

The characteristic quantity based detection unit 6 detects an object, or identifies the type of the object by processing more advanced than the difference method. The characteristic quantity based detection unit 5 in this example obtains information on a region of interest detected by the difference method based detection unit 4 or the under-silhouette-situation detection unit 5, and extracts a characteristic quantity in the neighborhood of the region in an input image. It is determined whether the characteristic quantity corresponds to a boat, a swimmer, a floating matter, or others (such as the sea surface, disturbance) using a machine learning technique.

The characteristic quantity is not limited to what is obtained from one image, and may be space-time characteristics obtained from the images in the latest plurality of frames, and all well-known characteristic quantities may be utilized. Similarly, all well-known characteristic quantities may be utilized also in a machine learning technique, and it is possible to utilize k-means, linear discriminant analysis (LDA), EM algorithm which are unsupervised learning (clustering), and logistic determination, support vector machine, decision tree, restricted Boltzmann machine which are supervised learning. However, depending on application, there is a preferable combination of a characteristic quantity and a learning unit. In this example, Random Forest is used as the learning unit, and texton characteristics (Semantic Texton Forests), a color histogram, HOG (Histograms of Oriented Gradients), HOF (Histograms of Optical Flow), DOT (Dominant Orientation Templates), MBH (Motion Boundary Histogram), and syllable lattice Hidden Markov Model are used as the characteristic quantity. Before these characteristic quantities are obtained from an input image, a low pass filter in a spatial domain and a time domain, or the optical flow processing described in Patent Literature 1 may be applied.

The tracking unit 7 attaches a label to a region of interest detected by the above-mentioned detection unit for each frame, and further associates the region of interest with a time direction. Thus, a swimmer and the like, which can be seen on and off in the trough of the waves, is continuously tracked, and a region erroneously detected singly is removed. Well-known techniques, such as a Kalman filter, a particle filter, a Bayesian filter, a mean shift, may be applied to the tracking unit 7 in this example. When necessary for those processing, the tracking unit 7 is provided with an original image in the region of interest. Tracking unit 7 can also predict the position in the near future. A buoy or a sign installed at a predetermined position on the sea is removed based on the position. Although the tracking unit 7 can also perform tracking based on the position shown in the image coordinate, it is desirable that tracking be performed using a position in a global coordinate system corresponding to the actual world based on the installation height, depression angle, angle of view (zoom magnification), and the like of a camera. The image coordinate and global coordinate can be converted by a projection matrix or a homography matrix (when an object position is restricted on one plane). Although the tracking unit 7 can perform tracking by integrating the coordinates of a region of interest from different detection units, in that case, information indicating which detection unit provides the region of interest utilized for generation of a trajectory, and other attributes of the region of interest are collected and held. Also, through the tracking, a new attribute such as change in the position from a previous frame may be added.

The threat evaluation unit 8 identifies what is the cause of a region of interest, and comprehensively evaluates a threat, and gives an alert in multiple stages in consideration of tendency of movement (particularly, approach to land). For instance, a region of interest is first recognized as a certain object lasting for 5 seconds or longer, not a disturbance of the sea surface, and subsequently, when the region of interest occupies a size of about 20 pixels due to approach of the object, the type of the object is successfully identified. Also, a tendency of approach to land can be determined by continuing tracking. That is, since a level of threat may change, every time a threat increases, the threat evaluation unit 8 gives a warning accordingly. Thus, it can be expected that the convenience and safety of maritime security are improved.

Identification of a region of interest is achieved using a rule based technique set by a human or a well-known machine learning technique based on the attributes of the region of interest collected by the tracking unit 7, and if available, a result of determination by the characteristic quantity based detection unit 6. Here, the attributes presented by a boat, a swimmer, and a floating matter are shown in the following table.

The level of threat particularly increases in a situation where clear intention of intrusion is presumed. For instance, the intention is presumed when it is determined that a target has approached a shore 10 m or longer in 10 seconds.

The configuration from the sea surface situation acquisition unit 3 to the threat evaluation unit 8 can be mounted using a DSP (Digital Signal Processor), an FPGA (Field-Programmable Gate Array), and other processors specialized in image signal processing. In order to obtain calculation performance of substantially 10000 MMACS (Million Multiply-Accumulates Per Second) or greater, it is preferable to adopt a coordinated design between DSP and FPGA, particularly a configuration in which a processing group which uses a memory band in a DSP is pipelined on an FPGA.

Figure 2:
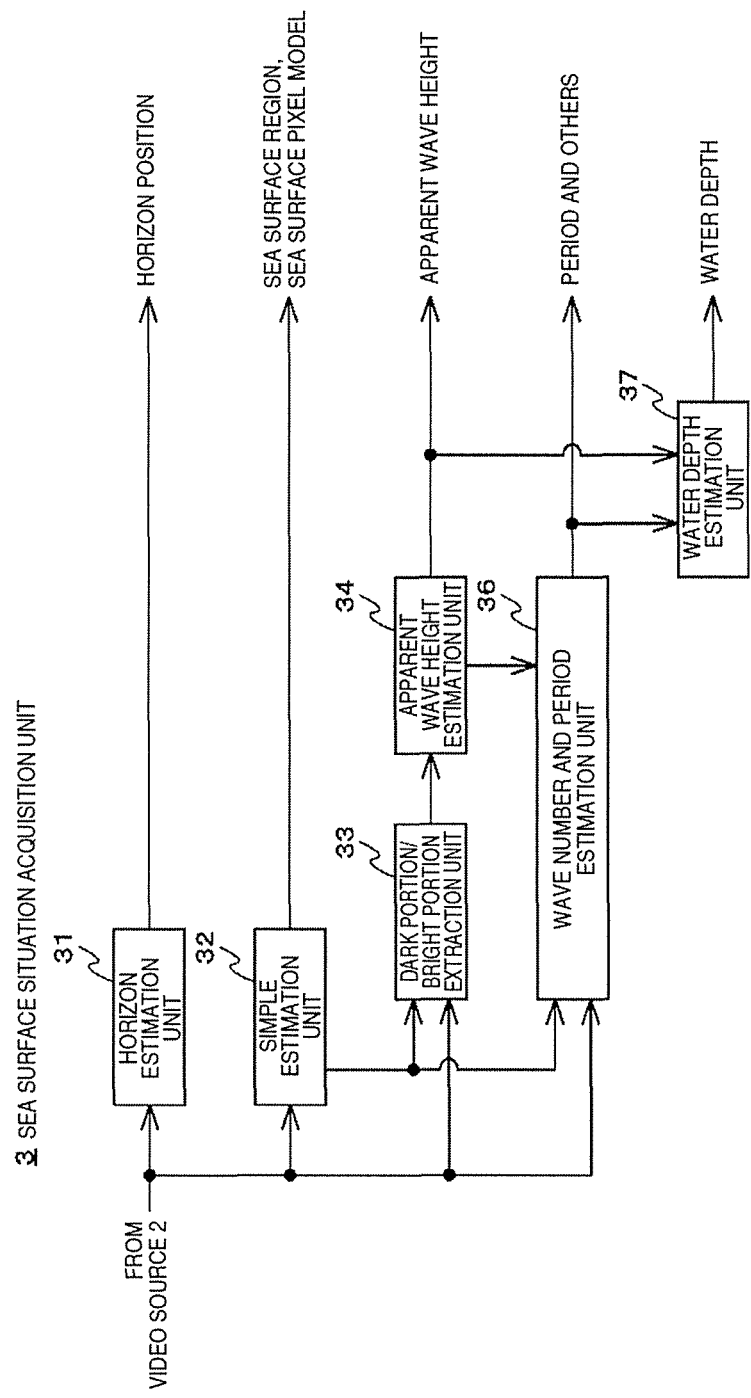
FIG. 2 is a functional block diagram of a sea surface situation acquisition unit 3 in this embodiment.

FIG. 2 is a functional block diagram of the sea surface situation acquisition unit 3 in this embodiment. A horizon estimation unit 31 applies a Canny edge detection filter and Hough transformation to any image from the image source 2 or a short-time background image, and determines the position of a substantially horizontal line segment. The position of the horizon obtained here is provided by the difference method based detection unit 4 to the tracking unit 7 as appropriate, and any detection is not made in the region above the horizon (mask region). In addition, the position of the horizon is used when the apparent distance between a region of interest and the horizon is calculated by the tracking unit 7 and other units.

A simple estimation unit 32 estimates a model of pixels in a plurality of predetermined evaluation regions (pixel block) in an input image from a video source, and outputs two thresholds for each region. Similarly to the background image in a general difference method, the image of sea surface can be represented by a mixed Gaussian distribution model. In this example, the sea surface is assumed, and there are bright portions and dark shadow portions corresponding to up and down of waves, and furthermore highlight portions, on which the sunlight is directly reflected, are assumed, and the presence of 2 or 3 distributions is estimated.

TABLE 1

|  | Visible image | infrared image | position change (correlation movement with wave) | size | aspect ratio | change in average luminance | edge | level of filling |
|---|---|---|---|---|---|---|---|---|
| Boat | indefinite | high luminance | uniform speed | large | constant | none | many | high |
| floating matter | indefinite | same as sea surface | disturbance synchronized with wave | indefinite | variable | small | few | medium |
| swimmer | indefinite | medium luminance | disturbance synchronized with wave | small | variable | big | few | low |

It is to be noted that when a target for which an edge is evaluated is a short-time background image, the degree of clarity of the contour of the image varies with the level of the motion. That is, the edge becomes thin for frequent motion, and the edge becomes closer to the original edge for less motion. Practically, more complicated determination than as shown in Table 1 (for instance, different tables for day and night are referred to) may be necessary. A result of identification of the region of interest is fed back to the difference method based detection unit 4, the under-silhouette-situation detection unit 5, and the characteristic quantity based detection unit 6, and is utilized for adjustment of parameters and online learning (reinforcement learning).

For determination of a threshold, it is possible to utilize the Mode method using the concentration values in valleys of histogram, the P-tile method that determines the number of pixels in ascending order of concentration in a histogram according to an area ratio of a region to be classified, the differential histogram method using a concentration value in which the value of a differential histogram has a maximum, Otsu threshold determination method, and a varying threshold method which changes a threshold according to a property of each portion in an image.

In this example, the Otsu method and the varying threshold method are combined. Specifically, at first, an appropriate threshold is set, and each pixel is classified into a distribution model (class) according to a pixel value, after accumulation over a sufficient number of frames, the number of pixels, the average, and the variance are calculated. For an initial threshold, since a highlight portion is composed of pixels with a saturated luminance value, a threshold for identifying these pixels can be easily determined. Also, for a threshold for dividing a bright portion and a dark portion, an overall average can be used. Subsequently, each threshold is updated so that the ratio of an in-class variance to an inter-class variance is maximized in accordance with the Otsu method. These processing are performed for each region. Also, it is also possible to perform processing using luminance values only without using color information. Since the image of the sea surface is relatively gentle, a distribution model is estimated for each of evaluation regions which are discretely set, and the space between regions can be estimated by interpolation. Alternatively, calculation can be performed not for each evaluation region, but per pixel unit.

A dark portion/bright portion extraction unit 33, when receiving an estimated distribution model from the simple estimation unit 32, selects one of classes corresponding to a bright portion and a dark portion. As an example, a class having a smaller variance or number of pixels is selected. In evaluation regions and nearby regions in an input image, the number of lengthwise pixels (height) in a block of pixels belonging to the selected class is calculated. This value includes the shadow of the waves when the sea surface is viewed diagonally, and the height and depth of an illuminated portion, and the value is not the actual height. Here, the reason why a class having a smaller value is selected is that in a class with a larger value, it is highly probable that a plurality of waves are connected, and such a region is prevented from being erroneously evaluated.

An apparent wave height estimation unit 34 converts the height of the block received from the dark portion/bright portion extraction unit 33 into a wave height using a predetermined conversion expression. The conversion expression is a function of depression angle, and may be further experientially corrected, however, for a smaller depression angle, its effect is smaller. The depression angle is set in advance or is provided from a calibration execution unit 72 (described later). The wave height has essentially a variation, and thus it is desirable that a plurality of samples be obtained, sorted, and processing such as averaging be performed on the samples between top x % and x %.

A wave number and period estimation unit 35 estimates a wave number and a period near each region based on images from the video source 2, and if possible, calculates a more reliable wave height based on the images. In addition, when a request is made from the threat evaluation unit 8, the wave number and period estimation unit 35 calculates and provides the wave height and the period of the waves at the location. The wave height at a location between regions is calculated by interpolating the wave height estimated by the apparent wave height estimation unit 34. Although there are various methods for estimating a wave number, when a plurality of waves with different directions and periods overlap, estimation is not easy based on an image with a low depression angle, particularly. It is assumed as necessary that waves moving from the offing to the shore in one direction are present. The period is obtained for a pixel in a region by applying FFT to pixel values in time series or a result of classification, and detecting a peak. More simply, the period is also obtained by a method in which the positions of the upper end and lower end of a block detected by the dark portion/bright portion extraction unit 33 are collected in time series, and a collection time is divided by the number of crossings of an average value.

A water depth estimation unit 36 estimates the depth of water at a location based on the characteristics of waves. For instance, the water depth can be calculated using a dispersion relationship of an infinitesimal amplitude wave as in Patent Literature 4.

[Math. 1]

$$\frac{2\pi}{T^2} = \frac{g}{L}\tanh\left(\frac{2\pi h}{L}\right) \qquad \text{(Expression 1)}$$

Here, T is the period of waves, g is the gravitational acceleration, and h is the water depth. A phenomenon that a wave height increases and a wavelength decreases for a shallow water depth is called wave shoaling, and a similar tendency is observed in complicated irregular waves. The wave shoaling is notably observed only where the water depth (in the offing) is less than ½ of the wavelength. The water depth estimation unit 36 does not need to obtain the absolute value of a water depth, and only needs to calculate a shoaling coefficient which indicates the wave height is how many times the wave height in the offing.

Figure 3:
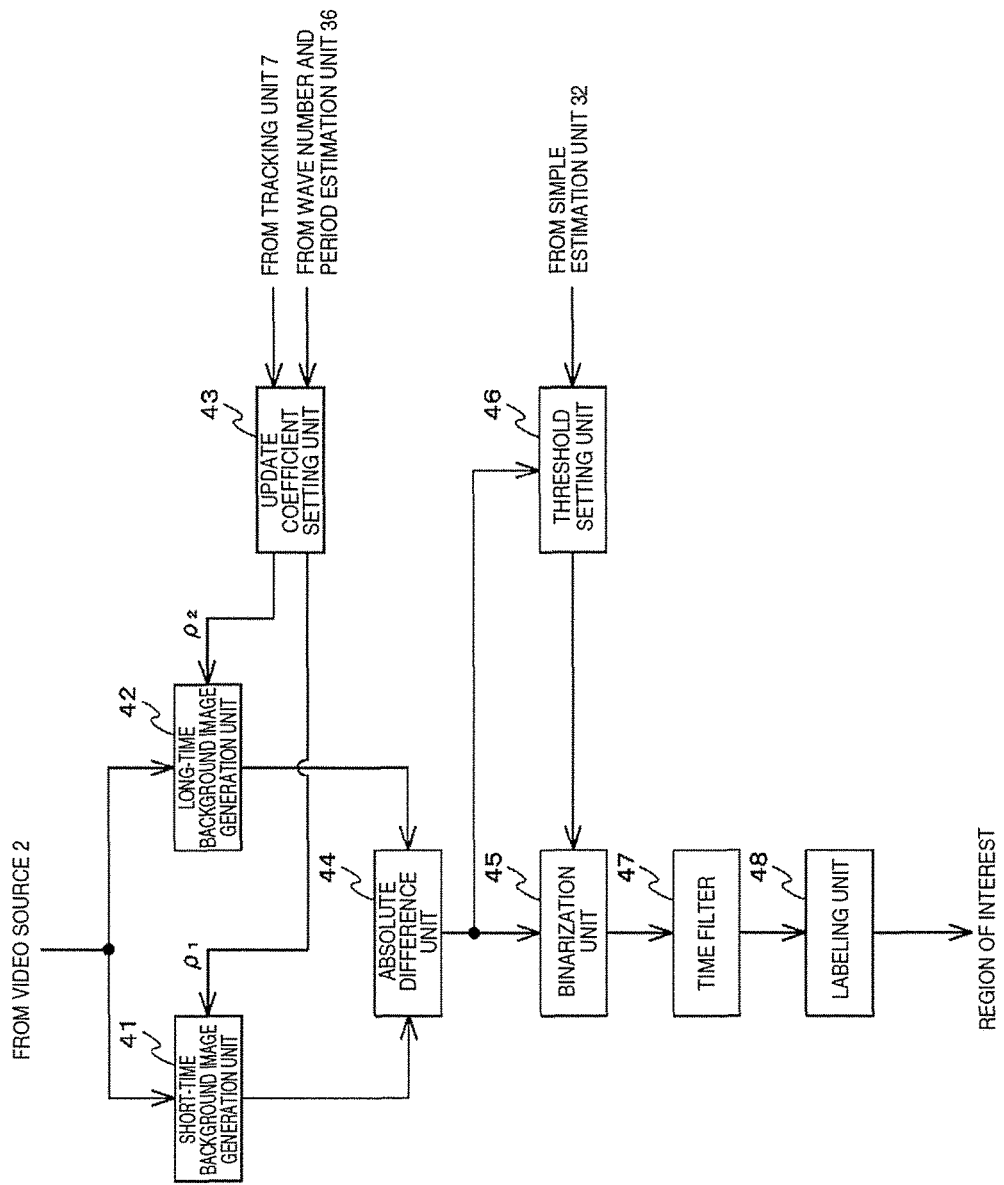
FIG. 3 is a functional block diagram of a difference method based detection unit 4.

FIG. 3 is a functional block diagram of the difference method based detection unit 4 in this embodiment. The difference method based detection unit 4 includes a short-time background image generation unit 41, a long-time background image generation unit 42, an update coefficient setting unit 43, an absolute difference unit 44, a binarization unit 45, a threshold setting unit 46, a time filter (true value holding unit) 47, and a labeling unit 48.

The short-time background image generation unit 41 has a frame memory internally, every time an image frame is inputted at a predetermined rate from the video source 2, composes the image frame and an image in a hurrah memory with a predetermined weight (update coefficient $\rho_1$), outputs the composite image as a short-time background image, and overwrites the composite image on the frame memory. This processing is called a time filter, a recursive filter, a IIR filter, or an exponential moving average, and has a time constant of the order of several 10th seconds, as an example.

The long-time background image generation unit 42 has a frame memory internally, every time an image frame is inputted from the video source 2 at a predetermined rate, composes the image frame and an image in the frame memory with a predetermined weight (update coefficient ρ2), outputs the composite image as a long-time background image, and overwrites the composite image on the hurrah memory. As an example, although the long-time background image generation unit 42 has the same configuration as the configuration of the short-time background image generation unit 41, the long-time background image generation unit 42 operates at a reduced frame rate or a relatively small update coefficient, and has a time constant of about several seconds or greater, as an example.

The long-time background image generation unit 42 can use a short-time background image outputted by the short-time background image generation unit 41 instead of an image from the video source 2. The long-time background image generation unit 42 may generate a background image (average image) or a dispersion value image in a plurality of frames based on a mixed distribution model in addition to simply a long-time background image in one frame. This can be implemented using a well-known code book method. For modeling, the result of the simple estimation unit 32 may be used.

The update coefficient setting unit 43 automatically adjusts update coefficients (update velocities) $\rho_1$, $\rho_2$ according to a temporal period and the number of detected regions of interest obtained by the sea surface situation acquisition unit 3. The update coefficient $\rho_1$ is set by, for instance, $\rho_1=\beta \cdot f$ so that update is performed with a time constant approximately the same as the period of wave (several seconds to 10 and several seconds). Here, f is the frequency of the wave, $\beta$ is a predetermined coefficient, and can be always adjusted according to the ratio of regions of interest for which tracking by tracking unit 7 is failed. In contrast, the update coefficient $\rho_2$ is set such that duration of the state of wave, which is said to be about 20 to 30 minutes, is defined as a reference, and update is performed with a time constant which is shorter than the duration and longer than the period of the wave.

The absolute difference unit 44 calculates the absolute value of the difference of values of corresponding pixels between a short-time background image and a long-time background image, and outputs the absolute value as a difference image. When the input image is a color image, the processing is performed for each color. It is to be noted that instead of the difference for each pixel, the difference between histograms in the neighborhood of a pixel of attention may be calculated.

The binarization unit 45 compares the difference image from the absolute difference unit 44 with a threshold to binarize the image, and outputs the binarized image. When the threshold input image is a color image, a threshold present for each color is used, and when a threshold is exceeded even for one color, 1 is set (in other words, logical sum), or the threshold processing may be further performed on the sum of exceeded amounts from the threshold. Alternatively, two types of thresholds may be prepared: in the one, detection failure is few, whereas erroneous detection is often, and in the other, erroneous detection is often, whereas detection failure is often, and results of respective processing may be outputted.

When a model based long-time background image can be utilized, for each pixel of a short-time background image, the binarization unit 45 calculates the difference from the pixel value of a corresponding pixel (block) in a long-time background image in a distribution model to which the pixel probably belongs. The threshold processing is achieved by comparing the absolute value of the difference with a threshold based on the variance of the corresponding pixel, and a logical value of 0 or 1 is outputted. When the pixels in an input image are modeled, in a short-time background image, pixels belonging to different distribution models overlap temporally in a strict sense. Therefore, the threshold is adjusted with respect to a reference which is the value obtained by adding ½ of the difference between respective averages of the model and an adjacent model to the variance of the distribution model.

The threshold setting unit 46 adaptably sets a threshold suitable for detection of a region of interest. As an example, pixel values (absolute differences) are averaged for each of a plurality of predetermined regions in the difference image, and thus a standard deviation in a distribution before each value is changed to its absolute value is obtained, and a threshold is obtained by multiplying the standard deviation by a predetermined coefficient. At a position of a pixel not belonging to a region, a threshold obtained in the neighborhood region is interpolated and applied. A coefficient is set by a human and is also adjusted according to a detection situation of a region of interest. When the pixels in an input image are modeled as a normal mixture, in a short-time background image, pixels belonging to different distribution models may overlap temporally. Therefore, the threshold is adjusted with respect to a reference which is the value obtained by adding ½ of the difference between respective averages of the model and an adjacent model to the variance of the distribution model.

The time filter 47 has a frame memory internally, and for each pixel, holds an index of the latest frame in which the pixel has a true value, and every time receiving a binarized image, and outputs an image (smoothing binary image) which has a true value if the index is within the past latest n frames while updating the index. By this processing, once a pixel has a true value, the value is maintained for at least n frames, and thus the shape of a block of true value pixels is getting closer to the shape of the object. It is to be noted that in addition to a time domain, a spatial domain filter such as a median filter may be applied.

The labeling unit 48 extracts a block of pixels each having a true value as the region of interest from the binarized image from the time filter 47 using an 8-neighborhood method or a contour tracking method, applies an index to the block, and obtains and outputs an attribute of the block. It is to be noted that when the processing is intensively performed by the tracking unit 7, the labeling unit 46 is unnecessary. When extraction is performed on the current frame utilizing a result of extraction (index table) from the last frame, the labeling unit 46 can achieve simple tracking.

When the video source 2 has respective images obtained from a visible range camera and a far-infrared camera provided in separate bodies, the difference method based detection unit 4 can process both images independently. If necessary, two sets of configuration from the short-time background image generation unit 41 to the labeling unit 48 may be provided. However, the two sets are not necessarily the same configuration, and in the set which processes a far-infrared image, the short-time background image generation unit 41 and the time filter 47 may be omitted.

Figure 4:
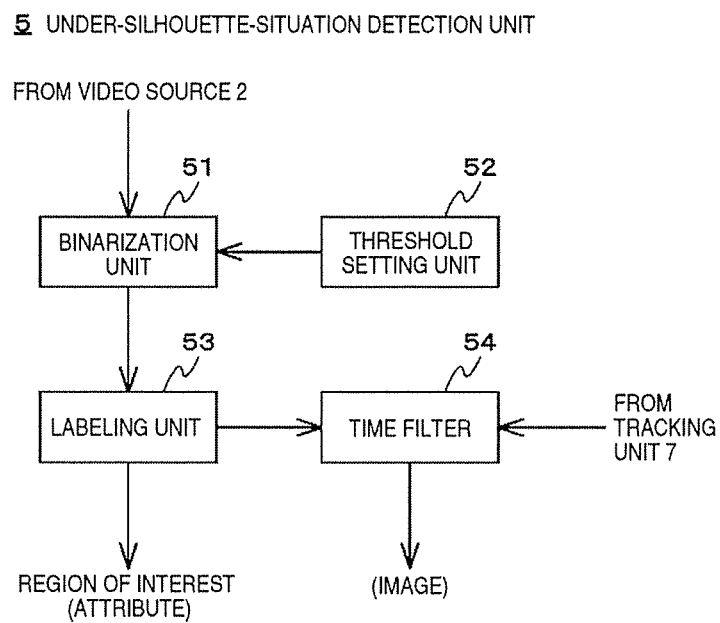
FIG. 4 is a functional block diagram of an under-silhouette-situation detection unit 5 in this embodiment.

FIG. 4 illustrates a functional block diagram of the under-silhouette-situation detection unit 5 in this embodiment. The under-silhouette-situation detection unit 5 includes a binarization unit 51, a threshold setting unit 52, a labeling unit 53, and a time filter 54. Similarly to the binarization unit 45, the binarization unit 51 binarizes an image from the video source 2, and outputs the binarized image. Provided that, an image is binarized such that when a pixel value is smaller than a threshold, the image is set to true, and when the pixel value is greater than or equal to the threshold, the image is set to false. It is sufficient that the binarization unit 51 can binarize only the luminance value of a pixel.

The threshold setting unit 52 provides a threshold used by the binarization unit 51. The threshold is only for distinguishing between saturation (highlight) and darkness, and thus can be given in a fixed manner, or a threshold generated by the simple estimation unit 32 may be utilized. The threshold may be adjusted according to the size of a region of interest detected by the labeling unit 53, for instance, when a region, which is too large compared to an assumed object size, is detected, the threshold is reduced.

The labeling unit 53 processes the binarized image from the binarization unit 51 for labeling in a manner similar to the labeling unit 46. It is not required but desirable that the labeling unit 53 obtain an attribute indicating a complexity of the contour of a region of interest, such as an aspect ratio, a filling rate, and the number of contour pixels.

By utilizing simple correspondence between frames made by the labeling unit 53, or a result of tracking by the tracking unit 7, the time filter 54 averages binarized images, corresponding between frames, of the region of interest with a centroid matched, and outputs an average image as an image of the region of interest. In a silhouette image, an object is shown in black, and the luminance or color information is not available from the object itself, thus when an object is attempted to be recognized only from the contour of a binarized image, there is concern that the accuracy may be reduced. However, motion blur included in an image obtained by the time filter 54 provides an additional characteristic quantity, and is expected to be useful for improvement of the accuracy. It is to be noted that instead of the binarized image, the original image of the region of interest may be averaged, and a time domain operation other than the averaging may be performed. The original image of a region of interest is obtained by logical product operation between an image frame from the video source 2 and a binarized image of the region of interest. The time filter 54 is not required.

Figure 5:
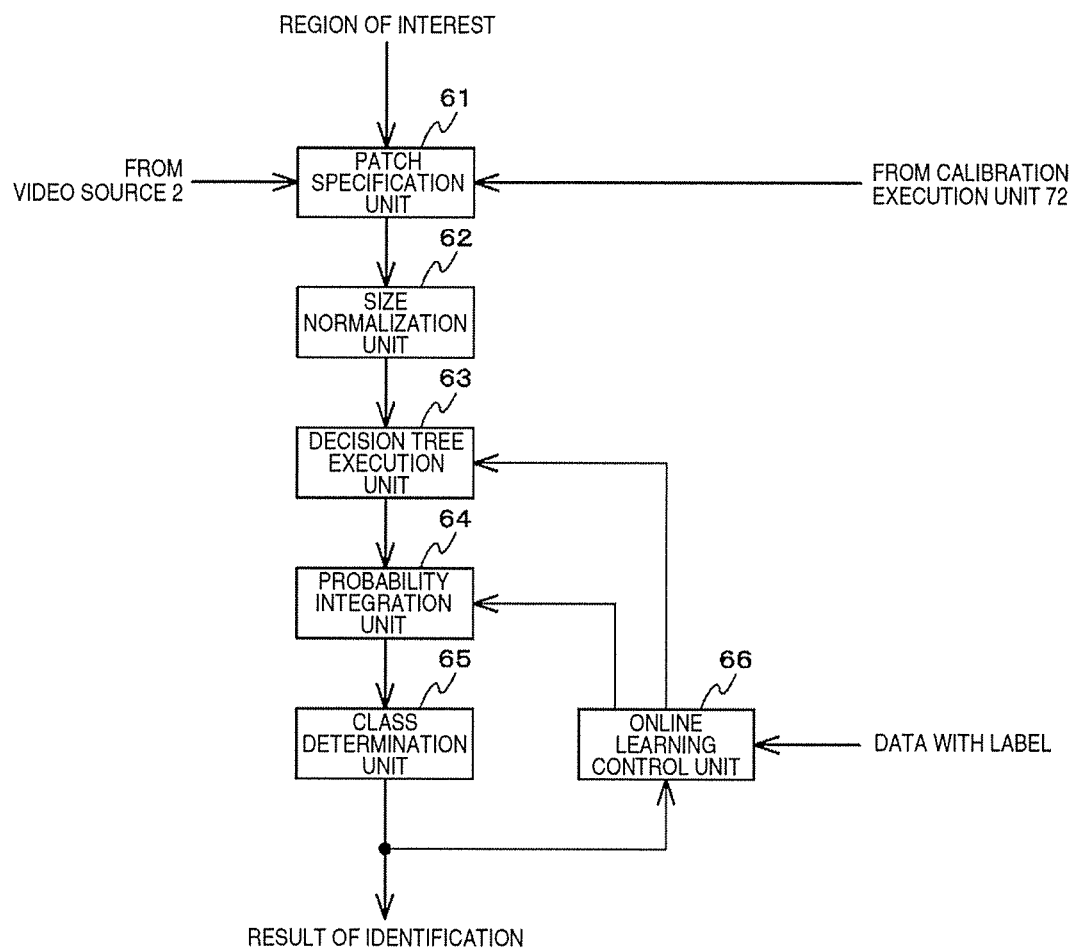
FIG. 5 is a functional block diagram of a characteristic quantity based detection unit 6 in this embodiment.

FIG. 5 illustrates a functional block diagram of the characteristic quantity based detection unit 6 in this embodiment. The characteristic quantity based detection unit 6 identifies an object utilizing a well-known Random Forest, and includes a patch specification unit 61, a size normalization unit 62, a decision tree execution unit 63, a probability integration unit 64, a class determination unit 65, and an online learning unit 66.

The patch specification unit 61 extracts a partial image from an image of the video source 2 by using an image patch appropriately including a region of interest detected by the difference method based detection unit 4 or the under-silhouette-situation detection unit 5. The shape of a patch is usually a square. The patch specification unit 61 can generate a plurality of image patches in any manner unless the processing capability of the characteristic quantity based detection unit 6 is exceeded. For instance, patches in a plurality of versions with different positions and sizes may be applied based on one region of interest, or even when a region of interest is not present, patches may be sequentially scanned and applied in the sea surface region detected by the sea surface situation acquisition unit 3. A size of the patch then is set based on a camera parameter obtained by the tracking unit 7 to include the boat when a boat or the like is present at the location of the patch (however, the size does not fall below the later-described normalization size). Conversely, when there are too many regions of interest detected from one image frame, the regions of interest have to undergo selection according to a standard such as a priority depending on the size of region, a request from the threat evaluation unit 8, or round robin. Also, when the decision tree execution unit 63 extracts a characteristic quantity from a frame at a different time or a frame which has processed by a different time domain operation, the same image patch is applied to respective frames.

The size normalization unit 62 normalizes the partial image cut out by the patch specification unit 61 to a predetermined size which can be received by the decision tree execution unit 63. When each pixel is in 4:4:4 format which has complete color information, for instance, 7×7 pixels is sufficient for the size.

The decision tree execution unit 63 traverses each of T decision trees created by prior learning, and outputs the probability of a class corresponding to a reached leaf node. Branching of the decision tree is performed by evaluating a branch function. As an example, the branch function performs threshold processing on a result of addition/subtraction of the values of specific 1 to 4 pixels in an image patch. As the threshold processing, Semantic Texton Forests is known. In each leaf node, the posterior probability of the class $p(c|v)=|Sc|/|S|$ is held in related to a sample used for learning, and it is sufficient to read the value. It is to be noted that $p(c|v)$ is the probability that v is identified as class c when v is inputted and, $|S|$ is the number of samples in sample set S used for learning, and $|Sc|$ is the number of samples belonging to class c in S. In this example, 5 or more classes consisting of a boat, a human, floating matter, a sea surface, and others are defined. As the characteristics of the decision tree execution unit 63 in this example, the values (explanatory variables) used by the branch function in some decision trees are not limited to those originated from an image patch, but include the attributes of a region of interest, for instance, the position (distance), the size, the complexity of a contour, and the average luminance of the region.

The probability integration unit 64 integrates posterior probabilities p obtained from the decision trees for each class. When there is no tree which arrives at a certain class c, the probability is 0, and when there is a plurality of trees, respective posterior probabilities p are integrated by arithmetic average, geometric average, maximum value, and others.

The class determination unit 65 determines a class corresponding to a maximum among the integrated posterior probabilities p, and outputs the class as an identification result.

The online learning unit 66 performs activity learning, semi-supervised learning, transductive learning, and other learning using data during operation, or continues learning using the same algorithm as that of prior off-line learning by label propagation, and improves the performance. In the activity learning, some alert is given, and a result of visual identification of an object by an operator is given to a learning machine. For instance, a result that the reliability of alert (the probability outputted by the class determination unit) is low, a result of failed identification, or what is probably confusing even by visual identification, what particularly needs to be learned due to subjective view of an operator, and additional data which is expected to contribute to determination of a boundary to be identified may be fed back. It is to be noted that in an algorithm, such as Adaboost, in which generalization error is reduced as learning is performed with training data having a large margin, data suitable for the algorithm should be fed back.

The transductive learning provides the concept and technique that accumulates labels by operators as test data, and minimizes the error in classifying the test data. For instance, various well-known techniques such as BrownBoost can be utilized for the branch function and learning of posterior probability by the decision tree execution unit 63, and ensemble learning by the probability integration unit 64. Boosting is a meta algorithm that generates an identification unit of a new version by assigning a large weight to the training data erroneously recognized by an identification unit of an existing version. In label propagation, a result of identification by the current class determination unit 65 is used as a temporary label. In a simple example, the posterior probability p held by a leaf node is updated.

Figure 6:
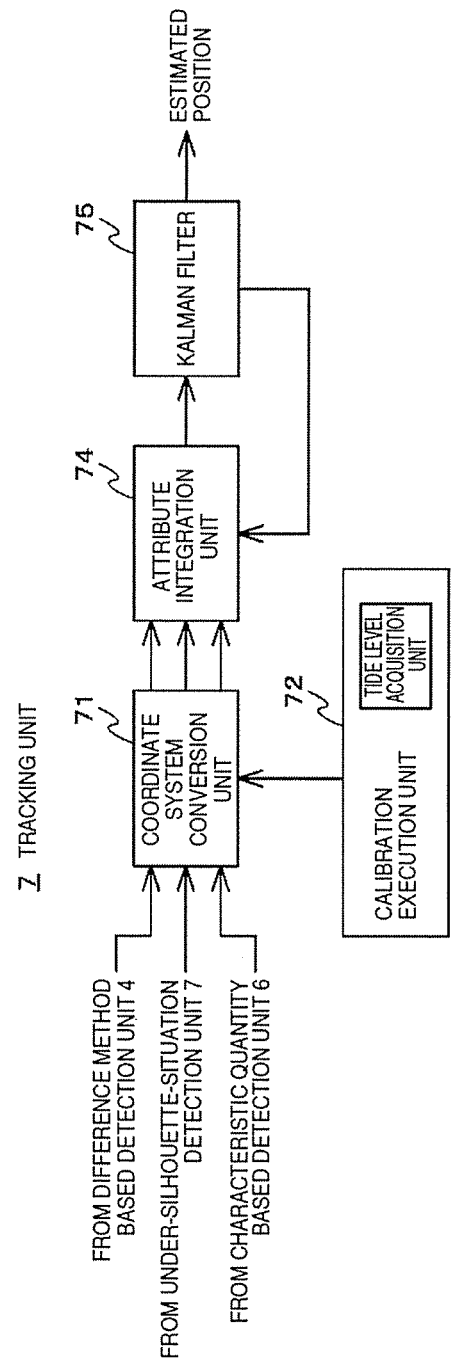
FIG. 6 is a functional block diagram of a tracking unit 7 in this embodiment.

FIG. 6 illustrates a functional block diagram of the tracking unit 7 in this embodiment. The tracking unit 7 includes a coordinate system conversion unit 71, a calibration execution unit 72, a tide level acquisition unit 73, an attribute integration unit 74, and a Kalman filter 75.

The coordinate system conversion unit 71 receives attributes of a region of interest from the difference method based detection unit 4 to the characteristic quantity based detection unit 6, and converts the coordinates and the size of the region of interest from the value of an image (scene) coordinate to the value of a global coordinate. In general, an image coordinate in homogeneous coordinate (homogenized coordinate) representation is converted into a global coordinate by using inverse matrix V of projection matrix P.

[Math. 2]

$$\begin{bmatrix} u_{image} \\ v_{image} \\ s \end{bmatrix} = P \begin{bmatrix} x_{world} \\ y_{world} \\ z_{world} \\ 1 \end{bmatrix} = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} \begin{bmatrix} x_{world} \\ y_{world} \\ z_{world} \\ 1 \end{bmatrix}$$ (Expression 2)

$$\begin{bmatrix} x_{world} \\ y_{world} \\ z_{world} \\ 1 \end{bmatrix} = P^{-1} \begin{bmatrix} u_{image} \\ v_{image} \\ s \end{bmatrix} = \begin{bmatrix} h_{11} & h_{12} & h_{13} \\ h_{21} & h_{22} & h_{23} \\ h_{31} & h_{32} & h_{33} \\ h_{41} & h_{42} & h_{43} \end{bmatrix} \begin{bmatrix} u_{image} \\ v_{image} \\ s \end{bmatrix}$$

Here, s is a value corresponding to the reciprocal of the depth in the image coordinate, and is calculated as follows by assigning above sea level $z_R$ of a region of interest in a global coordinate to $z_{world}$.

[Math. 3]

$$S = \frac{1}{h_{33}}(z_{world} - h_{31} \cdot u_{image} - h_{32} \cdot v_{image})$$ (Expression 3)

In the case of marine surveillance, it is possible to assume that the position of an object is Z=0 (that is, above sea level is 0) in a global coordinate. It is to be noted that the global coordinate in homogeneous coordinate representation in the above expression is divided by the value in the lowest row, $w=h_{41} \cdot u_{image}+h_{41} \cdot v_{image}+h_{43} \cdot s$, thereby providing a Euclidean coordinate. Like this, assigning a constant to $z_{world}$ is equivalent to the below-described Homography conversion or Direct Linear Transform a consequence.

[Math. 4]

$$x_{world} = (L_1 \cdot u | L_2 \cdot v | L_3)/(L_7 \cdot u | L_8 \cdot v | 1)$$ (Expression 4)

$$y_{world} = (L_4 \cdot u + L_5 \cdot v + L_6)/(L_7 \cdot u | L_8 \cdot v | 1)$$

$$\begin{bmatrix} x_1 & y_1 & 1 & 0 & 0 & 0 & -u_1 x_1 & -u_1 y_1 \\ 0 & 0 & 0 & x_1 & y_1 & 1 & -v_1 x_1 & -v_1 y_1 \\ \vdots & \vdots & \vdots & \vdots & \vdots & \vdots & \vdots & \vdots \\ x_n & y_n & 1 & 0 & 0 & 0 & -u_n x_n & -u_n y_n \\ 0 & 0 & 0 & x_n & y_n & 1 & -v_n x_n & -v_n x_n \end{bmatrix} \begin{bmatrix} L_1 \\ L_2 \\ \vdots \\ L_7 \\ L_8 \end{bmatrix} = \begin{bmatrix} u_1 \\ v_1 \\ \vdots \\ u_n \\ v_n \end{bmatrix}$$

Here, $(u_1, v_1) \ldots (u_n, v_n)$ are the image coordinates of n points for correction, $(x_1, y_1) \ldots (x_n, y_n)$ are global coordinates (metric) of those points, and n is a natural number greater than or equal to 4.

It is to be noted that when the distance to an object is long, the position in a global coordinate can be corrected by using the distance D between the camera and the object which is estimated from the apparent distance between the object and the horizon. For instance, when the position of the camera is at the origin of the global coordinate, distance information on the original coordinates is corrected in such a manner that the distance information is replaced with D as follows.

[Math. 5]

$$X'_{world}=D \cdot x_{world}/\sqrt{x_{world}^2+y_{world}^2}$$

$$Y'_{world}=D \cdot y_{world}/\sqrt{x_{world}^2+y_{world}^2}$$ (Expression 5)

The calibration execution unit 72 calculates the projection matrix P, Homography matrix H or a camera parameter necessary for conversion to a global coordinate. The projection matrix P is given by the product of an internal camera parameter matrix A and an external camera parameter (kinematic parameter) matrix M. The internal camera parameter matrix A is determined by a focal length, an aspect ratio of a pixel pitch, and others. The external camera parameter matrix M is determined by the installation position and an image capture direction of a camera. The projection matrix P has 11 degrees of freedom, and can be estimated from 6 or more known points using well-known Z. Zhang's method or Tsai's method.

The tide level acquisition unit 73 is provided in the calibration execution unit 72, and if available, obtains a more accurate sea surface water level and provides the sea surface water level to the calibration execution unit 72. The water level can be estimated based on a floating buoy or the height position of a sign provided at a predetermined location on the sea surface, or from the position of a coastline shown in an image of the video source 2 or the position of the water surface with respect to an artificial structure using image processing technology. Alternatively, tide level information may be obtained from the outside at any time, or tide (astronomical tide) data is internally held and may be read according to a calendar.

The attribute integration unit 74 associates a plurality of regions of interest obtained by the difference method based detection unit 4 to the characteristic quantity based detection unit 6 with corresponding regions of interest obtained in the past, passes the regions of interest to the Kalman filter 75 that tracks each region of interest, receives a result of the tracking from the Kalman filter 75, and integrates, adds or updates the attributes of regions of interest estimated to be the same. The association is established in such a manner that when the attributes of regions of interest particularly, the position coordinated, size, velocity represented in the global coordinate are similar to each other, the regions of interest are associated with each other. When regions of interest originating from the same object are obtained from a plurality of detection units, the regions of interest are integrated based on the similarity of attributes. Also, when tracking is successfully performed at least one time, a new attribute such as a trajectory or a velocity is added based on a change in the position, and every time tracking is successfully performed subsequently, similarly to other attributes, update or addition is made. Even when a region of interest originated from a single object from a certain frame are divided into multiple pieces and obtained, commonality between trajectories and the size are taken into consideration, and can be integrated. Through continuation of the tracking, a region of interest changes to an object which is probable to exist. When the tracking is interrupted, the attribute integration unit 74 can request the characteristic quantity based detection unit 6 to try to detect a region of interest near the current assumed position. In order to avoid interrupt of tracking due to passing of an object from the field of view of the video source 2, it is determined whether the current assumed position is out of the field of view or is about to be out of the field of view with the image coordinates or the global coordinates, and an electric camera platform on which the camera is mounted can be controlled.

The Kalman filter 75 receives the position coordinated of a region of interest from the attribute integration unit 74, performs Kalman filter processing for each region of interest, and outputs an estimated position. The estimated position has reduced noise. Kalman filter 75 internally estimates a model, thus the variance of calculated positions may be utilized as a threshold for establishing association in the attribute integration unit 74.

Figure 7:
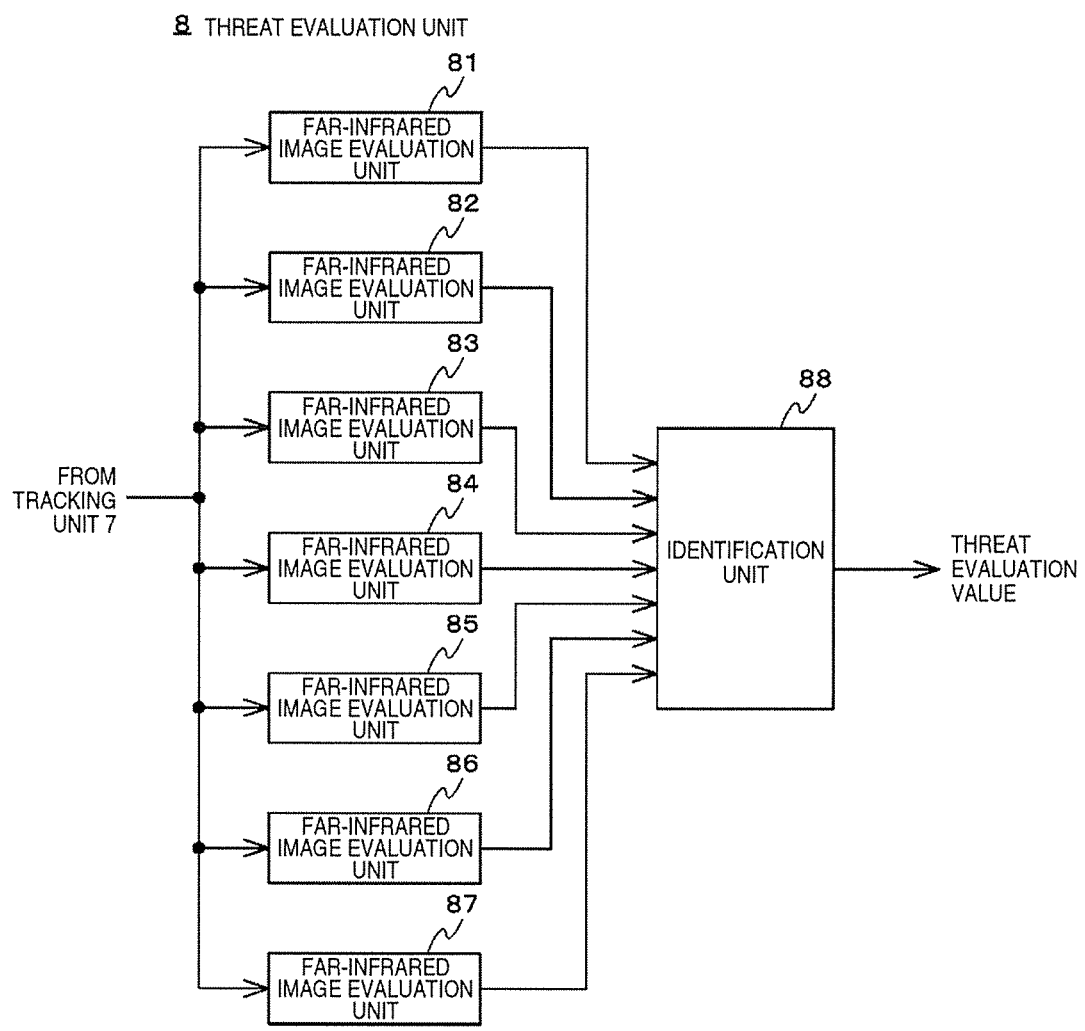
FIG. 7 is a functional block diagram of a threat evaluation unit 8 in this embodiment.

FIG. 7 illustrates an example of functional block diagram of the threat evaluation unit 8 in this embodiment. The threat evaluation unit 8 has a far-infrared image luminance evaluation unit 81, a position change evaluation unit 82, a size evaluation unit 83, an aspect ratio evaluation unit 84, a luminance variation evaluation unit 85, an edge evaluation unit 86, an important level evaluation unit 87, another evaluation unit 88, an identification unit 89, and an alert control unit 90. The configuration from the far-infrared image luminance evaluation unit 81 to a filling level evaluation unit 87 calculates a quantitative numerical value, such as a characteristic quantity (explanatory variable) or a probability which is used by the classification unit 88.

The far-infrared image luminance evaluation unit 81 evaluates a luminance in a region of interest in a far-infrared image among the attributes of regions of interest (objects) accumulated by the tracking unit 7, and outputs a numerical value for explaining the luminance. As an example, the far-infrared image luminance evaluation unit 81 outputs a value obtained by multiplying an average value of the luminances in a region of interest by a predetermined coefficient. The coefficient is also intended to normalize the variance of each characteristic quantity. Alternatively, when an average luminance is obtained, the far-infrared image luminance evaluation unit 81 may output a posterior probability that the average luminance indicates a boat, a floating matter, or a swimmer. The same goes with the other evaluation units in the following.

The position change evaluation unit 82 calculates a period and a width (wave height) of variation from the time series of a centroid position, which is one of the attributes of the accumulated regions of interest, and outputs a level of matching with the period and the wave height obtained by a sea surface acquisition unit 3, or a degree of linearity of positional change and equivalent speed as a converted numeral. The wave height may be compared with either one of an apparent wave height and an actual wave height, and for the comparison, if necessary, coordinate conversion is performed as appropriate. Alternatively, a statistical correlation value between the time series of the lengthwise position of a bright portion or a dark portion extracted by the dark portion/bright portion extraction unit 33, and the time series of the centroid position may be calculated near a region of interest. In contrast, as an example, a degree of linearity and equivalent speed can be converted to a numeral by dividing an average value of a magnitude (the absolute value or the component perpendicular to the velocity) of the acceleration by an average speed. The position of a region of interest used at this point may be the position before being processed by the Kalman filter 75, or the position in the image coordinate.

The size evaluation unit 83 outputs a value obtained by time-averaging and evaluating the size (world coordinate) which is one of the attributes of the accumulated regions of interest. It is to be noted that instead of time-averaging a median may be used. The same goes with the other evaluation units.

The aspect ratio evaluation unit 84 outputs a value obtained by time-averaging and evaluating the aspect ratio which is one of the attributes of the accumulated regions of interest.

The luminance variation evaluation unit 85 outputs a value obtained by evaluating a degree of variation such as a statistical variance or deviation from a time series of the average luminance which is one of the attributes of the accumulated regions of interest.

The edge evaluation unit 86 outputs a value obtained by time-averaging and evaluating the edge amount which is one of the attributes of the accumulated regions of interest.

The filling level evaluation unit 87 outputs a value obtained by time-averaging and evaluating the level of filling which is one of the attributes of the accumulated regions of interest.

The other evaluation unit 88 outputs another characteristic quantity or a parameter of the identification unit 89 based on the attributes of regions of interest. For instance, the other evaluation unit 88 outputs a characteristic quantity related to the type of a video source (visible/far-infrared) and sunshine (daytime/night), or a signal that switches an identification unit according to the characteristic quantity.

The identification unit 89 is a learned identification unit formed using well-known techniques such as, Case-based reasoning (k-neighborhood method), decision tree, logistic regression, Bayesian inference (including Hidden Markov Model), and perception. The identification unit 89 outputs a result of identification (classification) of a region of interest and/or the probability of each classification. Within the identification unit 89, it is possible to switch between parameters and learning machines according to an output of the other evaluation unit 88. When a result of identification by the characteristic quantity based detection unit 6 can be utilized, integration with the result may be made, and when evaluation values in both a far-infrared image and a visible image are obtained for a region of interest, as a consequence of identifying the both values, the values may be integrated. When from the far-infrared image luminance evaluation unit 81 to the important level evaluation unit 87 output the probability of each classification, the identification unit 89 may be formed of an ensemble learning unit that integrates those outputs.

An intrusion level evaluation unit 90 outputs an evaluation value related to a level of intrusion into territorial waters, or a level of approach to land, or intention or possibility of such intrusion or approach from a series of positional coordinates processed by the Kalman filter, the series of positional coordinates being one of the attributes of the accumulated regions of interest. As a simple example, the shortest distance to a coastline (reference line) or a territorial waters line in a map which holds the current position (global coordinate) in advance can be an evaluation value. However, an alert may be given to a boat which passes near the tip of a cape and has no intention of intrusion. For this reason, it is desirable that a large number of trajectories be learned using well-known machine learning techniques, outlier value (abnormal value) detection in response to a trajectory different from trajectory observed in normal times, and destination estimation be made, then an evaluation value be changed according to those values.

An alert control unit 91 outputs a continuous or sufficiently multiple-staged evaluation value indicating a level of threat of intrusion based on a result of the identification of the object by the identification unit 89 and the evaluation value outputted by the intrusion level evaluation unit 90, and outputs an alarm every time the evaluation value changes and crosses a set threshold. Although a result of identification of the identification unit 89 normally indicates a probability, even when the result indicates one selected class, reliability, which is higher for a longer tracking period of the Kalman filter 75 or a larger apparent size of a region of interest, may be used.

The configuration of the system, device and the like according to the present invention is not necessarily limited to what has been presented above, and various configurations may be used. For instance, difference processing may be performed on an image frame and a long-time background image without using a short-time background image. Although a great number of differences due to waves occur, there is a possibility that those differences can be distinguished by machine learning in the characteristic quantity based detection unit 6 and the like.

The present invention may also be provided, for instance, as a method or a device that executes the processing according to the present invention, a program for implementing such a method by a computer, and a tangible non-transient medium that records the program.

INDUSTRIAL APPLICABILITY

The present invention is applicable to a CCTV (Closed-Circuit Television) system and the like.

REFERENCE SIGNS LIST

1 SURVEILLANCE SYSTEM,
2 SURVEILLANCE CAMERA SYSTEM
3 SEA SURFACE SITUATION ACQUISITION UNIT
4 DIFFERENCE METHOD BASED DETECTION UNIT
5 UNDER-SILHOUETTE-SITUATION DETECTION UNIT
6 CHARACTERISTIC QUANTITY BASED DETECTION UNIT
7 TRACKING UNIT
8 THREAT EVALUATION UNIT

The invention claimed is:

1. A marine intrusion detection system comprising:
a sea surface situation acquisition unit that, based on an input image from a video source, automatically estimates attributes of waves including an amplitude and a period of waves on a water surface which is a background of the input image;
a difference detection unit that generates a reference image from the input image, and detects from the input image a pixel for which a value changes at a higher speed than in the reference image;
an under-silhouette-situation detection unit that detects a dark region as an object of interest from the input image which shows a background having a substantially saturated luminance and an object having a substantially dark luminance;
a characteristic quantity based detection unit that extracts an image characteristic quantity from the input image, and when the image characteristic quantity matching an object type learned through machine learning in advance is found, outputs the object type;
a tracking unit that attaches a label to a region of interest detected by the difference detection unit, the under-silhouette-situation detection unit, and the characteristic quantity based detection unit, associates the region of interest with a time direction, and updates integrated attributes of the region of interest; and
a threat evaluation unit that identifies an object which causes the region of interest, comprehensively evaluates a threat, and gives an alert in multiple stages in consideration of tendency of movement of the object.

2. The marine intrusion detection system according to claim 1,
wherein the difference detection unit includes:
a short-time background image generation unit that has a frame memory internally, every time an image frame is inputted at a predetermined rate from the video source, composes the image frame and an image in the frame memory with a weight corresponding to a first update coefficient, outputs the composite image as a short-time background image, and overwrites the composite image on the frame memory;
a long-time background image generation unit that has a frame memory internally, every time the image frame or the short-time background image is inputted, composes the image frame or the short-time background image, and an image in the frame memory with a weight corresponding to a second update coefficient, outputs the composite image as a long-time background image, and overwrites the composite image on the frame memory;
an update coefficient setting unit that automatically adjusts the first and second update coefficients based on the attributes of waves obtained by the sea surface situation acquisition unit;
an absolute difference unit that calculates an absolute value of difference of corresponding pixel values between the short-time background image and the long-time background image, and outputs the absolute values as a difference image;
a binarization unit that compares the difference image with a threshold to binarize the difference image, and outputs the binarized image;
a threshold setting unit that adaptably sets a threshold suitable for detection of the region of interest;
a time filter that, for a pixel having a true value in the binarized image, maintains the value at least for n frames; and
a labeling unit that extracts a block of pixels each having a true value as the region of interest from the binarized image from the time filter, assigns an index to the block, and obtains and outputs an attribute of the block.

3. The marine intrusion detection system according to claim 1,
wherein the under-silhouette-situation detection unit includes:
a binarization unit that binarizes the input image in such a manner that when a pixel value is smaller than a threshold, the input image is set to true, and when the pixel value is greater than or equal to the threshold, the input image is set to false;
a threshold setting unit that provides a threshold to be used by the binarization unit;
a labeling unit that extracts a block of pixels each having a true value as the region of interest from the binarized image from the binarization unit, assigns an index to the block, and obtains and outputs an attribute of the block; and
a time filter that averages binarized images, corresponding between frames, of the region of interest with a centroid matched, and outputs an average image as an image of the region of interest.

4. The marine intrusion detection system according to claim 1,
wherein the characteristic quantity based detection unit includes:
a patch specification unit that retrieves a partial image from an image of a video source by using an image patch appropriately including the region of interest detected by the difference detection unit or the under-silhouette-situation detection unit, or an image patch sequentially scanned;
a size normalization unit that normalizes a size of the partial image retrieved by the patch specification unit;
a decision tree execution unit that traverses each of a plurality of decision trees created by prior learning, and outputs a class corresponding to a reached leaf node;
an integration unit that integrates results obtained from the decision trees for each class;
a class determination unit that determines a most probable class from the results integrated by the integration unit, and outputs the class as a result of identification; and
an online learning unit that improves performance using data during operation.

5. The marine intrusion detection system according to claim 1,
wherein the sea surface situation acquisition unit includes:
a horizon estimation unit that detects a horizon from the input image and outputs a position relative to an image frame;
a simple estimation unit that estimates a model of pixels in a plurality of predetermined evaluation regions in the input image, and outputs at least one threshold for each of the evaluation regions as the estimated distribution model;
a dark portion/bright portion extraction unit that selects one of classes corresponding to a bright portion and a dark portion of the waves for each of the evaluation regions based on the estimated distribution model, and calculates the number of lengthwise pixels in a block of pixels belonging to the selected class;
an apparent wave height estimation unit that converts the number of lengthwise pixels in the block to a wave height using a predetermined conversion expression which is a function of depression angle;
a wave number and period estimation unit that estimates a wave number and a period near each of the evaluation regions based on the input image; and
a water depth estimation unit that estimates a water depth or a shoaling factor based on characteristics of waves.

6. The marine intrusion detection system according to claim 1,
wherein the tracking unit includes:
a coordinate system conversion unit that receives the attributes of the region of interest, and converts at least coordinates or a size of the region of interest from a value in an image coordinate into a value in a global coordinate;
a calibration execution unit that calculates a parameter necessary for conversion to the global coordinate;
a Kalman filter; and
an attribute integration unit that associates a plurality of the regions of interest with corresponding regions of interest obtained in past, passes the regions of interest to the Kalman filter that tracks each region of interest, receives a result of the tracking from the Kalman filter, and
integrates, adds or updates attributes of a region of interest estimated to be the same, the plurality of regions of interest being obtained by at least one of the difference detection unit, the under-silhouette-situation detection unit, and the characteristic quantity based detection unit.

7. The marine intrusion detection system according to claim 1,
wherein the threat evaluation unit includes:
a far-infrared image luminance evaluation unit that evaluates a luminance in a region of interest of a far-infrared image among attributes of regions of interest (objects) accumulated by the tracking unit, and outputs a numerical value which explains the luminance;
a position change evaluation unit that outputs a level of matching between a time series of a centroid position and waves obtained by a sea surface acquisition unit as a converted numeral, the time series of a centroid position being one of the attributes of the accumulated regions of interest;
a size evaluation unit that outputs a value obtained by time-averaging and evaluating a size which is one of the attributes of the accumulated regions of interest;
an aspect ratio evaluation unit that outputs a value obtained by time-averaging and evaluating an aspect ratio which is one of the attributes of the accumulated regions of interest;
a luminance variation evaluation unit that outputs a value obtained by evaluating a degree of variation from a time series of average luminance, which is one of the attributes of the accumulated regions of interest;
an edge evaluation unit that outputs a value obtained by time-averaging and evaluating an edge amount which is one of the attributes of the accumulated regions of interest;
a filling level evaluation unit that outputs a value obtained by time-averaging and evaluating a filling level which is one of the attributes of the accumulated regions of interest;
other evaluation units that outputs a type of the video source from which the regions of interest are obtained, a characteristic quantity related to sunlight, or a switching signal;
an identification unit that identifies a type of an object which causes the regions of interest;
an intrusion level evaluation unit that outputs an evaluation value related to a level of intrusion into territorial waters, or a level of approach to land, or intention or possibility of such intrusion or approach from a series of positional coordinates processed by the Kalman filter, the series of positional coordinates being one of the attributes of the accumulated regions of interest; and
an alert control unit that outputs a substantially continuous evaluation value indicating a level of threat of intrusion based on a result of the identification of the object by the identification unit and the evaluation value outputted by the intrusion level evaluation unit, and outputs an alarm every time the evaluation value changes and crosses a set threshold.

8. The marine intrusion detection system according to claim 1,
wherein at least one of the difference detection unit, the under-silhouette-situation detection unit, the characteristic quantity based detection unit, and the tracking unit at least obtains or updates a position, a size, and a degree of complexity of a contour, an average luminance as attributes of the attributes of the region of interest, in addition to the image characteristic quantity, the characteristic quantity based detection unit uses the attributes of the region of interest as explanatory variables, and the threat evaluation unit evaluates a higher threat for a higher tendency of approach of the object to land.

9. The marine intrusion detection system according to claim 8, wherein the difference detection unit includes:
a short-time background image generation unit that has a frame memory internally, every time an image frame is inputted at a predetermined rate from the video source, composes the image frame and an image in the frame memory with a weight corresponding to a first update coefficient, outputs the composite image as a short-time background image, and overwrites the composite image on the frame memory;
a long-time background image generation unit that has a frame memory internally, every time the image frame or the short-time background image is inputted, composes the image frame or the short-time background image, and an image in the frame memory with a weight corresponding to a second update coefficient, outputs the composite image as a long-time background image, and overwrites the composite image on the frame memory;
an update coefficient setting unit that automatically adjusts the first and second update coefficients based on the attributes of waves obtained by the sea surface situation acquisition unit;
an absolute difference unit that calculates an absolute value of difference of corresponding pixel values between the short-time background image and the long-time background image, and
outputs the absolute values as a difference image;
a binarization unit that compares the difference image with a threshold to binarize the difference image, and outputs the binarized image;
a threshold setting unit that adaptably sets a threshold suitable for detection of the region of interest;
a time filter that, for a pixel having a true value in the binarized image, maintains the value at least for n frames; and
a labeling unit that extracts a block of pixels each having a true value as the region of interest from the binarized image from the time filter, assigns an index to the block, and obtains and outputs an attribute of the block.

10. The marine intrusion detection system according to claim 8, wherein the under-silhouette-situation detection unit includes:
a binarization unit that binarizes the input image in such a manner that when a pixel value is smaller than a threshold, the input image is set to true, and when the pixel value is greater than or equal to the threshold, the input image is set to false;
a threshold setting unit that provides a threshold to be used by the binarization unit;
a labeling unit that extracts a block of pixels each having a true value as the region of interest from the binarized image from the binarization unit, assigns an index to the block, and obtains and outputs an attribute of the block; and
a time filter that averages binarized images, corresponding between frames, of the region of interest with a centroid matched, and outputs an average image as an image of the region of interest.

11. The marine intrusion detection system according to claim 8, wherein the characteristic quantity based detection unit includes:
a patch specification unit that retrieves a partial image from an image of a video source by using an image patch appropriately including the region of interest detected by the difference detection unit or the under-silhouette-situation detection unit, or an image patch sequentially scanned;
a size normalization unit that normalizes a size of the partial image retrieved by the patch specification unit;
a decision tree execution unit that traverses each of a plurality of decision trees created by prior learning, and outputs a class corresponding to a reached leaf node;
an integration unit that integrates results obtained from the decision trees for each class;
a class determination unit that determines a most probable class from the results integrated by the integration unit, and outputs the class as a result of identification; and
an online learning unit that improves performance using data during operation.

12. The marine intrusion detection system according to claim 8, wherein the sea surface situation acquisition unit includes:
a horizon estimation unit that detects a horizon from the input image and outputs a position relative to an image frame;
a simple estimation unit that estimates a model of pixels in a plurality of predetermined evaluation regions in the input image, and outputs at least one threshold for each of the evaluation regions as the estimated distribution model;
a dark portion/bright portion extraction unit that selects one of classes corresponding to a bright portion and a dark portion of the waves for each of the evaluation regions based on the estimated distribution model, and calculates the number of lengthwise pixels in a block of pixels belonging to the selected class;
an apparent wave height estimation unit that converts the number of lengthwise pixels in the block to a wave height using a predetermined conversion expression which is a function of depression angle;
a wave number and period estimation unit that estimates a wave number and a period near each of the evaluation regions based on the input image; and
a water depth estimation unit that estimates a water depth or a shoaling factor based on characteristics of waves.

13. The marine intrusion detection system according to claim 8, wherein the tracking unit includes:
a coordinate system conversion unit that receives the attributes of the region of interest, and converts at least coordinates or a size of the region of interest from a value in an image coordinate into a value in a global coordinate;
a calibration execution unit that calculates a parameter necessary for conversion to the global coordinate;
a Kalman filter; and
an attribute integration unit that associates a plurality of the regions of interest with corresponding regions of interest obtained in past, passes the regions of interest to the Kalman filter that tracks each region of interest, receives a result of the tracking from the Kalman filter, and integrates, adds or updates attributes of a region of interest estimated to be the same, the plurality of regions of interest being obtained by at least one of the difference detection unit, the under-silhouette-situation detection unit, and the characteristic quantity based detection unit.

14. The marine intrusion detection system according to claim 8, wherein the threat evaluation unit includes:

a far-infrared image luminance evaluation unit that evaluates a luminance in a region of interest of a far-infrared image among attributes of regions of interest (objects) accumulated by the tracking unit, and outputs a numerical value which explains the luminance;

a position change evaluation unit that outputs a level of matching between a time series of a centroid position and waves obtained by a sea surface acquisition unit as a converted numeral, the time series of a centroid position being one of the attributes of the accumulated regions of interest;

a size evaluation unit that outputs a value obtained by time-averaging and evaluating a size which is one of the attributes of the accumulated regions of interest;

an aspect ratio evaluation unit that outputs a value obtained by time-averaging and evaluating an aspect ratio which is one of the attributes of the accumulated regions of interest;

a luminance variation evaluation unit that outputs a value obtained by evaluating a degree of variation from a time series of average luminance, which is one of the attributes of the accumulated regions of interest;

an edge evaluation unit that outputs a value obtained by time-averaging and evaluating an edge amount which is one of the attributes of the accumulated regions of interest;

a filling level evaluation unit that outputs a value obtained by time-averaging and evaluating a filling level which is one of the attributes of the accumulated regions of interest;

other evaluation units that outputs a type of the video source from which the regions of interest are obtained, a characteristic quantity related to sunlight, or a switching signal;

an identification unit that identifies a type of an object which causes the regions of interest;

an intrusion level evaluation unit that outputs an evaluation value related to a level of intrusion into territorial waters, or a level of approach to land, or intention or possibility of such intrusion or approach from a series of positional coordinates processed by the Kalman filter, the series of positional coordinates being one of the attributes of the accumulated regions of interest; and an alert control unit that outputs a substantially continuous evaluation value indicating a level of threat of intrusion based on a result of the identification of the object by the identification unit and the evaluation value outputted by the intrusion level evaluation unit, and outputs an alarm every time the evaluation value changes and crosses a set threshold.

\* \* \* \* \*